(12) United States Patent
Alarcon et al.

(10) Patent No.: US 9,985,455 B2
(45) Date of Patent: May 29, 2018

(54) CHARACTERIZATION AND INTELLIGENT CHARGING OF ELECTRONIC CIGARETTES

(71) Applicant: LOEC, Inc., Greensboro, NC (US)

(72) Inventors: Ramon Alarcon, Los Gatos, CA (US); Michael Starman, Los Gatos, CA (US)

(73) Assignee: FONTEM HOLDINGS 4 B.V., Amsterdam (NL)

( * ) Notice: Subject to any disclaimer, the term of this patent is extended or adjusted under 35 U.S.C. 154(b) by 217 days.

(21) Appl. No.: 14/711,593

(22) Filed: May 13, 2015

(65) Prior Publication Data

US 2015/0333542 A1   Nov. 19, 2015

Related U.S. Application Data

(60) Provisional application No. 61/992,669, filed on May 13, 2014.

(51) Int. Cl.
*H02J 7/00* (2006.01)
*A24F 47/00* (2006.01)

(52) U.S. Cl.
CPC ............ *H02J 7/007* (2013.01); *A24F 47/008* (2013.01); *H02J 7/0045* (2013.01); *H02J 2007/0098* (2013.01)

(58) Field of Classification Search
CPC ............................. H02J 7/0052; H02J 7/0054
USPC ........................................................ 320/106
See application file for complete search history.

(56) References Cited

U.S. PATENT DOCUMENTS

| | | | |
|---|---|---|---|
| 5,986,430 A | 11/1999 | Fernandez et al. | |
| 6,025,698 A | 2/2000 | Kim et al. | |
| 6,104,163 A | 8/2000 | Komatsu et al. | |
| 8,689,804 B2 | 4/2014 | Fernando et al. | |
| 8,851,081 B2 | 10/2014 | Fernando et al. | |
| 9,089,166 B1 | 7/2015 | Scallerday | |
| 2008/0211455 A1 | 9/2008 | Park et al. | |
| 2011/0265806 A1 | 11/2011 | Alarcon et al. | |
| 2013/0167854 A1* | 7/2013 | Shin ...................... | A24F 47/008 131/329 |
| 2013/0284192 A1 | 10/2013 | Peleg et al. | |
| 2013/0336358 A1 | 12/2013 | Liu et al. | |
| 2013/0340775 A1 | 12/2013 | Juster et al. | |
| 2013/0341218 A1 | 12/2013 | Liu | |
| 2014/0014125 A1 | 1/2014 | Fernando et al. | |
| 2014/0062417 A1 | 3/2014 | Li et al. | |
| 2014/0107815 A1 | 4/2014 | LaMothe | |
| 2014/0224267 A1 | 8/2014 | Levitz et al. | |
| 2015/0027472 A1 | 1/2015 | Amir | |
| 2015/0035540 A1* | 2/2015 | Xiang ................ | G01R 31/3624 324/426 |
| 2015/0069952 A1* | 3/2015 | Xiang .................. | H02J 7/0052 320/107 |
| 2015/0136155 A1* | 5/2015 | Verleur ................ | A24F 47/008 131/328 |

(Continued)

FOREIGN PATENT DOCUMENTS

WO   2013144160 A1   10/2013
WO   2014029880 A2   2/2014

(Continued)

*Primary Examiner* — Suchin Parihar
(74) *Attorney, Agent, or Firm* — Dykema Gossett PLLC

(57) ABSTRACT

An electronic cigarette includes a smart battery that is capable of communicating data to a charging pack, resulting in customized charging of the smart battery for optimal performance.

20 Claims, 4 Drawing Sheets

(56) References Cited

U.S. PATENT DOCUMENTS

2016/0120218 A1    5/2016   Schennum et al.
2016/0204637 A1*   7/2016   Alarcon ................ A24F 47/008
                                                                       320/114

FOREIGN PATENT DOCUMENTS

| WO | 2015158482 A1 | 10/2015 |
| WO | 2015165813 A1 | 11/2015 |
| WO | 2016012795 A1 | 1/2016 |

* cited by examiner

CHARACTERIZATION AND INTELLIGENT CHARGING OF ELECTRONIC CIGARETTES

CROSS-REFERENCE TO RELATED APPLICATIONS

This application claims priority to U.S. provisional patent application Ser. No. 61/992,669, filed on 13 May 2014, which is hereby incorporated by reference in its entirety, for all purposes, as though fully set forth herein

FIELD OF THE DISCLOSURE

The present disclosure relates to a system, a method, and a device for characterization and intelligent charging of electronic cigarettes.

BACKGROUND OF THE DISCLOSURE

Electronic cigarettes, also known as e-cigarettes (eCigs) and personal vaporizers (PVs), are a popular alternative to traditional tobacco-based cigarettes that must be burned in order to generate smoke for inhalation. Electronic cigarettes provide a vapor for inhalation, but do not contain certain byproducts of combustion that may be harmful to human health. Electronic cigarettes are electronic inhalers that vaporize or atomize a liquid solution (smoke juice) into an aerosol mist that may then be delivered to a user. A typical eCig has two main parts—a housing holding a battery and a cartomizer. The housing holding the battery typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

SUMMARY OF THE DISCLOSURE

According to an aspect of the disclosure, an eCig includes a smart battery that is capable of communicating data to a charging pack, resulting in customized charging of the smart battery for optimal eCig performance. Data can be communicated between the eCig smart battery and the pack using either a dedicated data line or signals obtained from the power line connecting the smart battery and the pack during charging. According to another aspect of the disclosure, a method includes using the pack to determine whether or not the eCig being charged has a smart battery.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
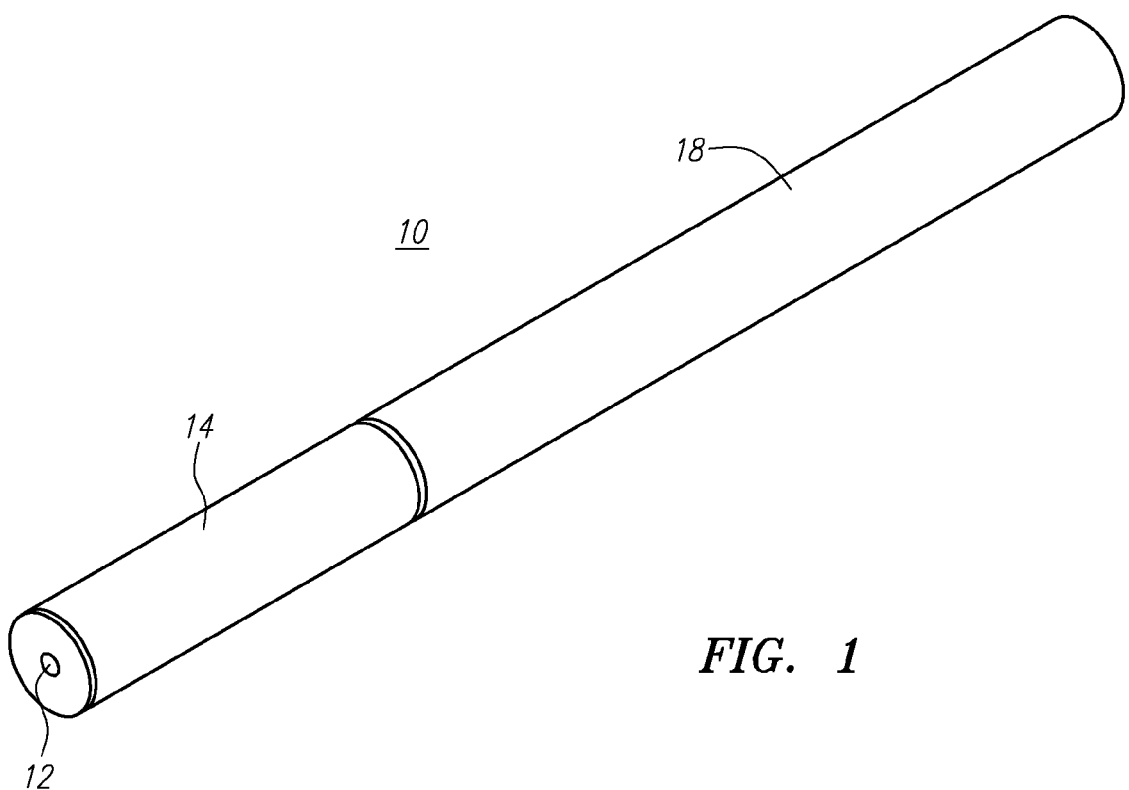
FIG. 1 shows an example of an electronic article that is constructed according to an aspect of the disclosure.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of an electronic article 10 according to an aspect of the disclosure. In the instant example, the electronic article 10 comprises an eCig. However, the electronic article 10 may comprise any article that may be charged by an external power supply, such as, e.g., a rechargeable battery, or the like.

The eCig 10 comprises a cartridge 14 and an eCig body 18. The cartridge 14 comprises an opening 12 through which aerosol may be delivered to a user. The cartridge 14 comprises a solution (not shown) and an atomizer (not shown). The solution may include, e.g., a liquid, a gel, a solid, or a gas that comprises molecules (or particles) to be delivered in an aerosol to a user. The eCig body 18 includes a power supply (e.g., a rechargeable Li-ion battery) (not shown) and an LED (not shown). In an alternative embodiment, the cartridge 14 and the eCig body 18 can be combined into a single unit.

Figure 2:
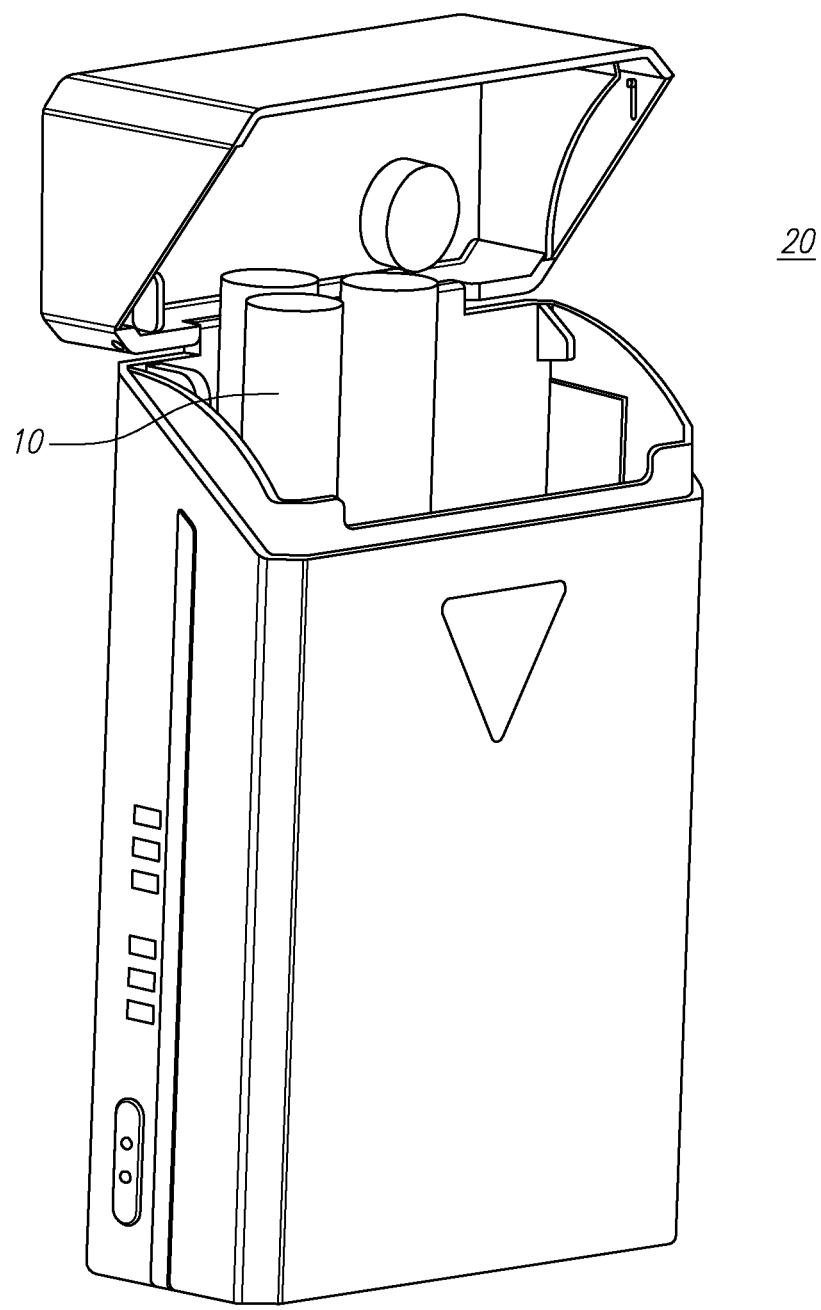
FIG. 2 shows an example of a charging holder that is constructed according to an aspect of the disclosure.

FIG. 2 shows an example of a eCig pack (charging holder) 20. The pack 20 in this example comprises a eCig charging pack. The pack 20 comprises one or more regions that are configured to receive the eCig body 18, and/or the cartridge 14, and/or the entire eCig 10. In the example illustrated in FIG. 2, the pack 20 comprises a plurality of regions, each of which is configured to receive a respective eCig 10, or a component of the eCig 10 (e.g., cartridge 14 and/or eCig body 18). The pack 20 comprises a charging device that connects to and supplies a power source to charge the power supply (e.g., Li-ion battery) in the eCig 10, or a component of the eCig 10 (e.g., cartridge 14 and/or eCig body 18).

Figure 3:
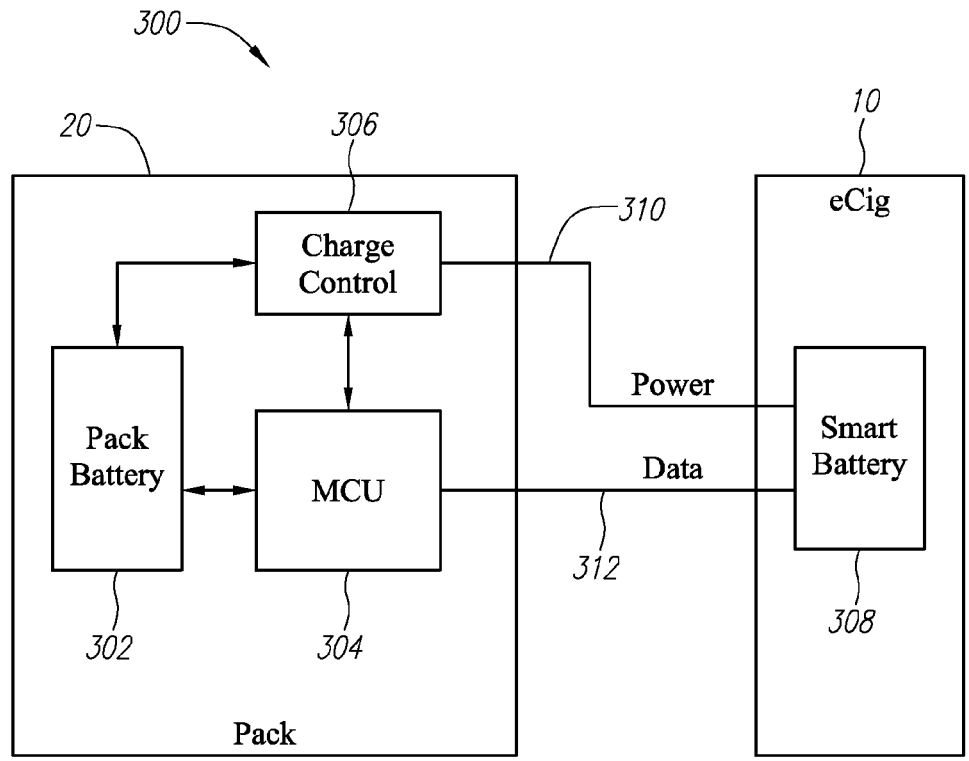
FIG. 3 illustrates an example of a system for charging an eCig within a charging pack.

FIG. 3 illustrates an embodiment of a system 300 for charging an eCig 10 within the charging pack 20. Although the system 300 will be described below with respect to the charging pack 20, a charging base station could be used instead of or in addition to the pack 20. The pack 20 comprises a battery 302, a charge control unit 306, and a micro-control unit (MCU) 304. The pack battery 302 supplies power to the eCig 10 via power line 310. Specifically, the pack battery 302 can supply power to a smart battery 308 within the eCig 10. The charge control unit 306 can control the amount of power supplied by the pack battery 302 to the eCig 10, such as by controlling voltage output, current, or both. The MCU 304 can communicate with both the pack battery 302 and the charge control unit 306, and can also control the amount of power provided to eCig 10 by controlling voltage, current, or both.

In an example, a data line 312 can be used to transfer data between the smart battery 308 and the MCU 304. The data line 312 can be a physical wire connection or a wireless communication. The data that can be transferred includes the status of the smart battery 308 (e.g., voltage and current levels), as well as the brand, manufacture date, expiration date, and tolerance, for example, of smart battery 308. When the MCU 304 receives data describing the characteristics of smart battery 308, it can customize charging of the smart battery 308, so as to charge for optimal performance. For example, the MCU 304 can use data to determine what voltage and current smart battery should be charged at. The MCU 304 can then communicate this information to either to the pack battery 302 or the charge control unit 306.

In an alternative embodiment, system 300 may not include a dedicated data line 312. In this case, data can be transmitted via the power line 310 used to charge the eCig 10. For example, a broadcasting signal can be sent by the eCig 10 to the MCU 304 within the pack 20 during the recharging process.

Figure 4:
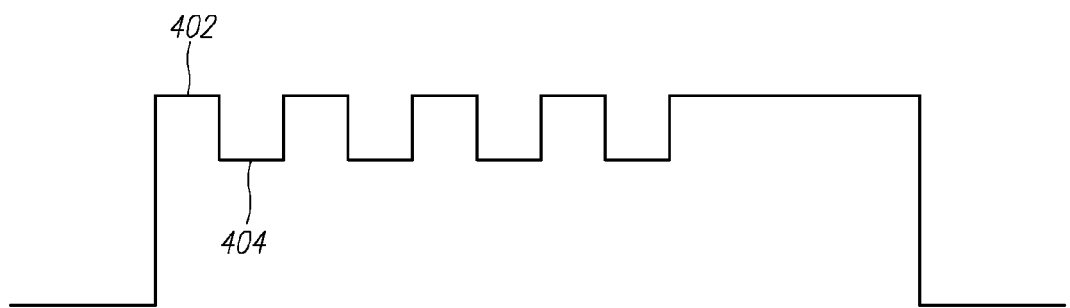
FIG. 4 illustrates an example of a broadcasting signal used to communicate data between an eCig smart battery and a charging pack.

One example of such a broadcasting signal is a pulse-width modulation signal, such as that illustrated in FIG. 4. This broadcast is sent through the electrical circuit that is used to recharge the eCig 10, and can be of any variety that allows the data to be transferred. In the illustrated embodiment, two levels of current, a peak level 402 and a low level 404, are illustrated. The pack 20 can be configured to detect the level of current flowing through the system at any point in time and to identify information being transmitted by the eCig smart battery 308 via this current flow. The duration of time a peak level 402 and a low level 404 of current are present within the circuit can communicate to the pack 20 specific information, such as the voltage and current levels of the smart battery 308. This information can then be used by the MCU 304 or charge control unit 306 to determine what voltage and current levels the pack battery 302 should use to charge the eCig smart battery 308. In an example, the pack 20 can be configured to charge eCig batteries ranging from about 3.5 volts to about 4.5 volts.

In an embodiment, the pack 20 can record how frequently it is used to charge an eCig 10 with a smart battery 308. The pack 20 can adapt the way it charges the eCig 10 based on this information. For example, if the eCig smart battery 308 is recharged often, then the MCU 304 or charge control unit 306 can tell the pack battery 302 to charge the smart battery 308 at a rapid rate. If the smart battery 308 is recharged infrequently, the MCU 304 or charge control unit 306 can tell the pack battery 302 to charge the smart battery 308 at a slow rate, thereby extending the life of the smart battery 308.

In some cases, charging pack 20 may be used to charge an eCig with a non-smart battery (e.g. a regular lithium-ion battery) that cannot communicate information about its characteristics or status to the pack 20. This allows the pack 20 to retain backward compatibility with the older technology when smart batteries enter the market place. However, the pack 20 must determine whether the eCig battery it is smart or not because this will determine the charge rate for the eCig battery. Charging the eCig battery at the correct rate is important, for example, to preserve the lifespan of the battery.

Figure 5:
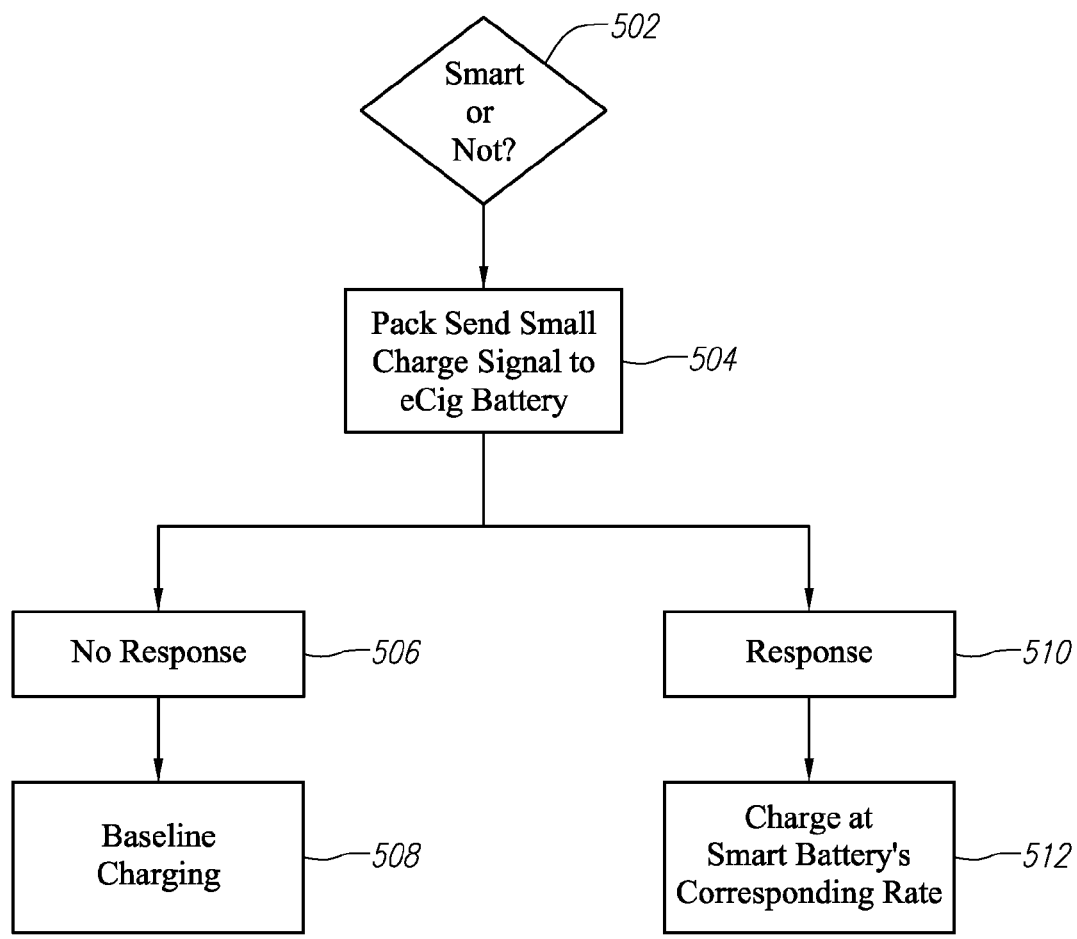
FIG. 5 is a flow chart illustrating an example of a method for determining whether a pack is charging an eCig with a smart battery or an eCig with a non-smart battery.

FIG. 5 illustrates an example of a method 500 for determining whether an eCig battery is smart or not (step 502). At 504, the pack 20 can send a small charge signal to the eCig battery. If, at 506, the pack 20 does not receive any data response from the eCig battery, then it is determined (e.g., by MCU 304) that the battery is non-smart and, at 508, charging occurs at a baseline rate. The baseline rate can be determined, for example, by observing the discharge rate of the non-smart battery and then using a look-up table to determine the appropriate charge rate for that battery. If, on the other hand, the pack receives a data response from the eCig battery at 510, then it is determined (e.g., by MCU 304) that the e Cig battery is smart. Consequently, at 512, charging occurs at the requested rate (i.e. the rate corresponding to the smart battery's voltage and current levels).

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed is:

1. A system for charging an electronic smoking device comprising:
   a charging base station comprising a micro-control unit (MCU); and
   an electronic smoking device comprising at least one of a first battery or a second battery, the electronic smoking device communicatively linked to the charging base station via at least one of a power line or a data line;
   wherein the charging base station is configured to send a charge signal to the first battery via the at least one of the data line or the power line;
   wherein, in response to the charge signal, the first battery is configured to communicate data indicative of a characteristic of the first battery to the MCU via the at least one of the data line or the power line; and
   wherein the MCU is configured to determine a charging parameter for the first battery based on the data.

2. The system of claim 1, wherein the charging base station comprises a charging pack configured to store and charge the electronic smoking device.

3. The system of claim 1, wherein the charging base station further comprises a third battery communicatively linked to the MCU, the third battery configured to supply power to the at least one of the first battery or the second battery via the power line.

4. The system of claim 3, wherein the charging base station further comprises a charge control unit communicatively linked to the third battery and the MCU, the charge control unit configured to control the power supplied by the third battery to the first battery based on the determined charging parameter.

5. The system of claim 1, wherein the charging parameter comprises at least one of a voltage output, current output, or a charge rate.

6. The system of claim 1, wherein the characteristic of the first battery comprises at least one of a voltage level, a current level, a brand, a manufacture date, an expiration date, a tolerance, or a charge frequency.

7. The system of claim 6, wherein the MCU is configured to determine the characteristic of the first battery based on a broadcasting signal.

8. The system of claim 1, wherein the charging base station is configured to distinguish between the first battery and the second battery.

9. The system of claim 8, wherein the charging base station is configured to provide a baseline charge to the second battery.

10. The system of claim 9, wherein the baseline charge is determined based on the discharge rate of the second battery.

11. A method for charging an electronic smoking device comprising:
   communicatively linking a charging base station to the electronic smoking device via at least one of a power line or a data line;
   using the charging base station to:
      send a charge signal to a battery of the electronic smoking device;
      receive data in response to the charge signal, wherein the data is indicative of a characteristic of the battery;
      determine a charging parameter based on the data; and
      control power supplied by the charging base station to the battery based on the charging parameter.

12. The method of claim 11, wherein the characteristic of the battery comprises at least one of a voltage level, a current level, a brand, a manufacture date, an expiration date, a tolerance, or a charge frequency.

13. The method of claim 11, wherein the charging parameter comprises at least one of a voltage output, current output, or a charge rate.

14. The method of claim 11, wherein using the charging base station to receive data in response to the charge signal further comprises using at least one of the power line or the data line communicatively linking the battery to the charging base station.

15. The method of claim 14, wherein using the power line to receive data in response to the charge signal comprises using a broadcasting signal.

16. The method of claim 15, wherein the broadcasting signal comprises a pulse width modulation signal.

17. A method for determining a charging rate for a battery of an electronic smoking device, the method comprising:
   communicatively linking a charging base station to the battery of the electronic smoking device;
   using the charging base station to:
      send a charge signal to the battery;
      detect the presence or absence of a data response signal from the battery in response to the charge signal;
      charge the battery at a baseline rate when the data response signal is absent; and
      charge the battery at a customized rate when the data response signal is present.

18. The method of claim 17, wherein the baseline rate is based on a discharge rate of the battery.

19. The method of claim 17, wherein the customized rate comprises a rate corresponding to at least one of a voltage level or a current level of the battery.

20. The method of claim 17, wherein the presence of a data response signal indicates that the battery is a smart battery configured to be charged at the customized rate for optimal performance.

* * * * *